Figure 1:
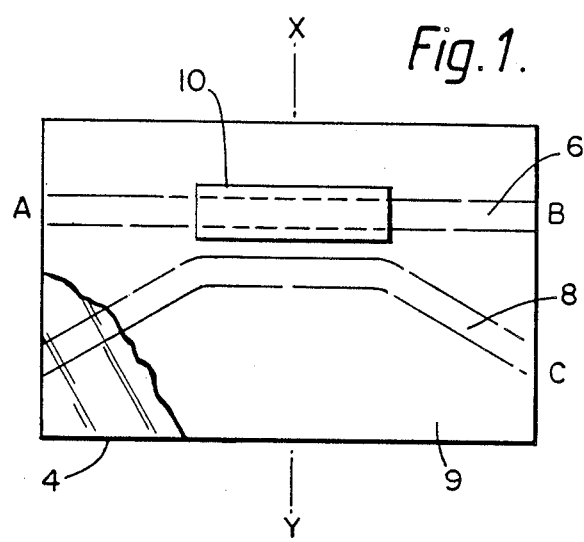

United States Patent [19]  
Allen et al.

[11] Patent Number: 4,981,612  
[45] Date of Patent: Jan. 1, 1991

[54] OPTICAL ELEMENT HAVING NON-LINEAR OPTICAL PROPERTIES

[75] Inventors: Simon Allen, Cheadle Hulme; Paul F. Gordon, Rochdale, both of England; Joseph Zyss, Bagneux, France

[73] Assignee: Imperial Chemical Industries PLC, London, England

[21] Appl. No.: 190,433

[22] Filed: May 5, 1988

[30] Foreign Application Priority Data

May 13, 1987 [FR] France ............................... 87 401073  
Jul. 24, 1987 [FR] France ............................... 87 401750

[51] Int. Cl.$^5$ ...................... C09B 29/06; G11B 7/24; C07C 245/08; G02F 7/004
[52] U.S. Cl. ................................. 252/583; 252/585; 252/586; 534/573; 534/650; 534/851
[58] Field of Search ................. 534/851, 650, 573 L; 252/583, 585, 586

[56] References Cited  
FOREIGN PATENT DOCUMENTS 0220042 4/1987 European Pat. Off. ............ 534/251

Primary Examiner—Floyd D. Higel  
Attorney, Agent, or Firm—Cushman, Darby & Cushman

[57] ABSTRACT

An optical element, such as a wave guide, having non-linear optical properties, suitable for use in optical devices in which it is desirable to alter the characteristics of the light, comprising a transparent or reflecting substrate having at least a partial superficial coating comprising alternating monolayers of a first non-linear optical (NLO) compound of the formula:

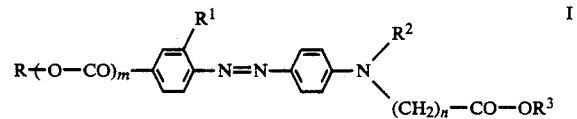

wherein  
R is an non-hydrophilic aliphatic or cycloaliphatic group containing from 8 to 40 carbon atoms;  
m is 1 or 2;  
$R^1$ is $NO_2$, CN or $COOR^2$;  
$R^2$ is H or $C_{1-4}$-alkyl;  
n is from 1 to 4; and  
$R^3$ is H, a metal or a group containing a tetravalent N atom and a second NLO compound of the formula:

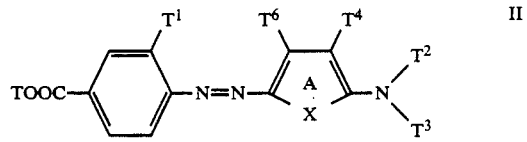

wherein  
T is H, a metal or a group containing a tetravalent N atom;  
X is S, O,

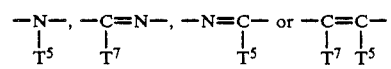

$T^1$ is $NO_2$, CN or COOY;  
Y is selected from H, $C_{1-4}$-alkyl, a metal or a group containing a tetravalent N atom;  
$T^2$ and $T^3$ are each independently H or a non-hydrophilic aliphatic or cycloaliphatic group containing up to 30 carbon atoms;  
$T^4$ and $T^5$ are each independently H or a non-hydrophilic aliphatic or cycloaliphatic group containing up to 30 carbon atoms; and  
$T^6$ and $T^7$ are each independently H or a non-hydrophilic group containing up to 4 carbon atoms; or  
$T^4$ and $T^6$ together comprise ring fused to Ring A and $T^5$ and $T^7$ are as hereinbefore defined; or  
$T^5$ and $T^7$ together comprise ring fused to Ring A and $T^4$ and $T^6$ are as hereinbefore defined; or  
$T^2$ and $T^4$ together with the N atom to which $T^2$ is attached form a ring fused to Ring A and $T^3$ and $T^5$ are as hereinbefore defined; or  
$T^3$ and $T^5$ together with the N atom to which $T^3$ is attached form a ring fused to Ring A and $T^2$ and $T^4$ are as hereinbefore defined;

provided there are, in total, from 8 to 40 carbon atoms in one or two of the groups independently represented by $T^2$, $T^3$, $T^4$ and $T^5$.

7 Claims, 1 Drawing Sheet

OPTICAL ELEMENT HAVING NON-LINEAR OPTICAL PROPERTIES

This specification describes an invention relating to an optical element having non-linear optical (NLO) properties comprising alternating monomolecular layers of two related azo compounds.

According to the present invention there is provided an optical element having non-linear optical properties (hereinafter called the "NLO element") comprising a transparent or reflecting substrate having at least a partial superficial coating (hereinafter called the "NLO coating") comprising alternating monolayers of a compound of the formula:

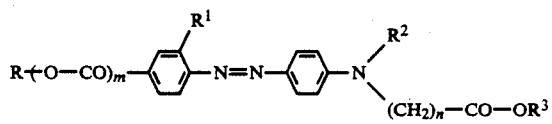

wherein
- R is a non-hydrophilic aliphatic or cycloaliphatic group containing from 8 to 40 carbon atoms;
- m is 1 or 2;
- $R^1$ is $NO_2$, CN or $COOR^2$,
- $R^2$ is H or $C_{1-4}$-alkyl;
- n is from 1 to 4. and
- $R^3$ is H, a metal or a group containing a tetravalent N atom (hereinafter called the "first NLO compound") and a compound of the formula:

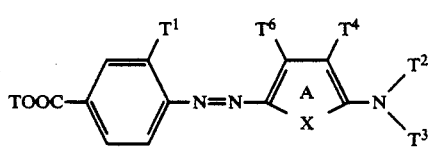

wherein
- T is H, a metal or a group containing a tetravalent N atom;
- X is S, O,

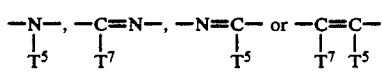

- $T^1$ is $NO_2$, CN or COOY;
- Y is selected from H, $C_{1-4}$-alkyl, a metal or a group containing a tetravalent N atom;
- $T^2$ & $T^3$ are each independently H or a non-hydrophilic aliphatic or cycloaliphatic group containing up to 30 carbon atoms;
- $T^4$ & $T^5$ are each independently H or a non-hydrophilic aliphatic or cycloaliphatic group containing up to 30 carbon atoms; and
- $T^6$ & $T^7$ are each independently H or a non-hydrophilic group containing up to 4 carbon atoms; or
- $T^4$ & $T^6$ together comprise ring fused to Ring A and $T^5$ & $T^7$ are as hereinbefore defined;
- or $T^5$ & $T^7$ together comprise ring fused to Ring A and $T^4$ & $T^6$ are as hereinbefore defined; or
- $T^2$ & $T^4$ together with the N atom to which $T^2$ is attached form a ring fused to Ring A and $T^3$ & $T^5$ are as hereinbefore defined; or
- $T^3$ & $T^5$ together with the N atom to which $T^3$ is attached form a ring fused to Ring A and $T^2$ & $T^4$ are as hereinbefore defined;

provided there are, in total, from 8 to 40 carbon atoms in one or two of the groups independently represented by $T^2$, $T^3$, $T^4$ & $T^5$ (hereinafter called the "second NLO compound").

The term "non-hydrophilic" in the above definition means that the groups concerned should not carry hydrophilic substituents, such as carboxylate, sulphonate, phosphonate and hydroxyl.

The First NLO Compound

In the first NLO compound it is preferred that R is a long chain aliphatic and/or cycloaliphatic group, preferably the former, containing from 8 to 20 and more preferably from 12 to 20 carbon atoms. Minor variations in chain length within these preferred limits have little effect on the non-linear optical properties of the compound. It is also preferred that the aliphatic chain is unbranched or, at most, contains only one or two branches, each containing one or two carbon atoms.

The long chain aliphatic or cycloaliphatic group represented by R is preferably alkyl, alkenyl or cycloalkyl or a group containing a mixture of these. The carbon chain in R may be interrupted by heteroatoms, especially oxygen or sulphur, but it is preferred that there is not more than one heteroatom for every twelve carbon atoms in the chain. The group represented by R may carry non-hydrophilic substituents, such as halogen atoms, but is preferably a hydrocarbon.

Examples of the group represented by R are octyl, nonyl, decyl, hendecyl, dodecyl (lauryl), tridecyl, tetradecyl (myristyl), pentadecyl, hexadecyl (cetyl), heptadecyl (margaryl), octadecyl (stearyl), nonadecyl, eicosanyl (archadiyl), heneicosanyl, docasanyl (behenyl), tricosanyl, tetracosanyl (lignoceryl), hexacosanyl (ceryl), 9-hexadecenyl (palmitoleyl), 9-octadecenyl (oleyl), 10-eicosenyl, 9,12-octadecadienyl (linoleyl) and 6-hexoxyhexyl.

It is preferred that m is 1.
It is preferred that $R^1$ represents a nitro group.
It is preferred that $R^2$ is H or methyl.
It is preferred that n is 1 or 2.
Where $R^3$ is a metal, it is preferably divalent. Preferred metals are cadmium, barium, lead and calcium and other suitable metals are manganese, zinc, magnesium and strontium.

Where $R^3$ is a group containing a tetravalent nitrogen atom this may be ammonium, such as $NH_4$, mono-, di- or tri-substituted or quaternary ammonium, bis(ammonium), such as alkylene- and alkenylene-diammonium, guanidinium, biguanidinium and amidinium. The tetravalent N atom may carry substituents other than hydrogen and suitable substituents include alkyl, such as methyl, ethyl, lauryl, cetyl, stearyl, aryl, such as phenyl, aralkyl, such as benzyl, cycloalkyl, such as cyclohexyl, which may themselves be substituted by such $C_{1-4}$-alkyl, e.g. tolyl, $C_{1-4}$-alkoxy, e.g. anisyl and ethoxyethyl, halogen, e.g. chlorophenyl and hydroxy, e.g. hydroxyethyl. Specific examples of suitable groups are $NH_4$, $N(CH_3)_4$, $N(C_2H_4OH)_4$, $N(CH_3)_3(C_{18}H_{37})$, $H_3N-C_4-NH_3$.

The first NLO compound may be prepared by diazotising a substituted aniline of the formula:

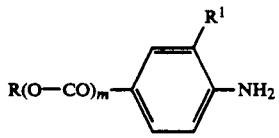

and coupling with a N-substituted aniline of the formula:

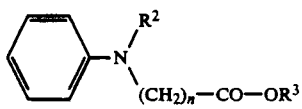

A preferred first NLO compound is derived from a diazotisable aniline of Formula III in which R is $C_{12-18}$-alkyl and $R^1$ is nitro, especially 2-nitro-4-[dodecoxycarbonyl]aniline, 2-nitro-4-[heptadecoxycarbonyl]aniline, 2-nitro-4-[octadecoxycarbonyl]-aniline and 2-nitro-4-dodecylaniline, and an N-substituted aniline of Formula IV in which $R^2$ is methyl or ethyl, n is 2 and $R^3$ is H, Ca or Cd, especially N-methyl-N-(2-[hydroxycarbonyl]ethyl)aniline, N-ethyl-N-(2-[hydroxycarbonyl]-ethyl)aniline and N-(2-[hydroxycarbonyl]ethyl)aniline and the calcium and cadmium salts thereof. Specific examples of the first NLO compound:

4-(2-nitro-4-[heptadecyloxycarbonyl]phenylazo)-N-methyl-N-(2-[hydroxycarbonyl]ethyl)aniline,
4-(2-nitro-4-[heptadecyloxycarbonyl]phenylazo)-N-ethyl-N-(2-[hydroxycarbonyl]ethyl)aniline,
4-(2-nitro-4-[heptadecyloxycarbonyl]phenylazo)-N-(2-[hydroxycarbonyl]ethyl)aniline,
4-(2-nitro-4-[dodecyloxycarbonyl]phenylazo)-N-methyl-N-(2-[hydroxycarbonyl]ethyl)aniline,
4-(2-nitro-4-[dodecyloxycarbonyl]phenylazo)-N-ethyl-N-(2-[hydroxycarbonyl]ethyl)aniline,
4-(2-nitro-4-[octadecyloxycarbonyl]phenylazo)-N-methyl-N-(2-[hydroxycarbonyl]ethyl)aniline
4-(2-nitro-4-[octadecyloxycarbonyl]phenylazo)-N-ethyl-N-(2-[hydroxycarbonyl]ethyl)aniline. and
4-(2-nitro-4-dodecylphenylazo)-N-methyl-N-(2-[hydroxycarbonyl]ethylaniline and the calcium and cadmium salts thereof.

The first NLO compound is non-centrosymmetric and substantially polarised along its longitudinal axis because the carboxyl, nitro and cyano groups are electron-withdrawing and the N-alkylcarboxylate group is electron-donating. A molecule of the compound can, thus, be represented as an electronic vector directed along this axis from the N-alkylcarboxylate group towards the aliphatic group R.

The Second NLO Compound

This is the compound described and claimed in our co-pending European Patent Application No. 86307904.2 (filed 13 Oct. 1986).

In the second NLO compound, where T or Y is a metal it is preferably divalent, preferred metals being cadmium, calcium, barium and lead and other suitable metals being manganese, zinc, magnesium and strontium.

Where T or Y is a group containing a tetravalent nitrogen atom this may be ammonium, such as $NH^4$, mono-, di- or tri-substituted or quaternary ammonium, such as mono-, di-, tri- and quaternary alkyl and substituted alkyl ammonium; bis(ammonium), such as alkylene and alkenylene diammonium; guanidinium; biguanidinium and amidinium. The tetravalent N atom may carry substituents other than hydrogen and suitable substituents include $C_{1-20}$-alkyl, such as methyl, ethyl, lauryl, cetyl, stearyl; aryl, such as phenyl; aralkyl, such as benzyl; cycloalkyl, such as cyclohexyl; each of which may be substituted by such as $C_{1-4}$-alkyl, e.g. tolyl; $C_{1-4}$-alkoxy, e.g. anisyl and ethoxyethyl; halogen, e.g. chlorophenyl; and hydroxy, e.g. hydroxyethyl. Specific examples of suitable groups are $NH_4$, $N(CH_3)_4$, $N(C_2H_4OH)_4$, $N(CH_3)_3$, $(C_{18}H_{37})$, $N(CH_3)_3(C_{16}H_{33})$, $H_3N-C_2H_4-NH_3$ and $N(CH_3)_2(C_{12}H_{25})(-CH_2C_6H_5)$. Where Y is $C_{1-4}$-alkyl it is preferably methyl.

It is preferred that $T^1$ is CN or, more especially, $NO_2$.

Where $T^4$ & $T^6$ or $T^5$ & $T^7$ and two ring carbon atoms form a second ring, fused to Ring A, this is preferably aromatic and may be carbo- or hetero-cyclic, such as, benzene, pyrrole, furan, thiazole, isothiazole, thiophene or pyridine, in which case Ring A and $T^4$ & $T^6$ or $T^5$ & $T^7$ form a naphthalene, indole, benzofuran, benzothiazole, benzoisothiazole, thianaphthene or quinoline nucleus, respectively.

Where $T^4$ & $T^2$ or $T^5$ & $T^3$, together with the N atom and two carbon atoms of Ring A form a second ring, fused to Ring A, this is preferably a 5 or 6 membered cycloaliphatic ring such as 2-pyrroline, tetrahydropyridine, 4-oxazoline or 4-thiazoline, in which case $T^2$, $T^4$ (or $T^3$, $T^5$), Ring A and the N atom form 2,3-dihydroindole, 1,2,3,4-tetrahydroquinoline, benzoxazoline or benzothiazoline, respectively.

It is preferred that at least one of $T^2$, $T^3$, $T^4$, $T^5$, and especially $T^2$, but not more than two, preferably $T^2$ and one of $T^3$, $T^4$ & $T^5$, is a long chain aliphatic or cycloaliphatic group, preferably the former, containing from 8 to 20, more preferably 12 to 20, carbon atoms in which case the remaining groups preferably contain not more than 4 carbon atoms and are more preferably hydrogen. If none of $T^2$, $T^3$, $T^4$ and $T^5$ contains 8 or more carbon atoms then it is preferred that $T^2$ and $T^3$ are aliphatic or cycloaliphatic groups carrying a total of at least 8, and more preferably at least 12, carbon atoms and $T^4$ & $T^5$ each contains not more than 4 carbon atoms. Minor variations in chain length within these preferred limits have little effect on the non-linear optical properties of the compound. It is also generally preferred that the aliphatic chain is unbranched or at most contains only a one or two branches, each containing one or two carbon atoms.

The long chain aliphatic or cycloaliphatic group represented by $T^2$, $T^3$, $T^4$ or $T^5$ is preferably an alkyl, alkenyl or cycloalkyl group or a group containing a mixture of these which, in the case of $T^4$ and $T^5$, may be joined directly to Ring A or indirectly through a heteroatom, such as oxygen, sulphur or nitrogen or through a —CO—, —SO$_2$—, —CO.O— or —SO$_2$.O— link. The carbon chain may be interrupted by heteroatoms, especially oxygen or sulphur, but it is preferred that there is not more than one hetero-atom for every twelve carbon atoms in the chain. The carbon chain may carry non-hydrophilic substituents, but is preferably unsubstituted.

Examples of the group containing at least 8 carbon atoms, represented by $T^5$, $T^4$, $T^3$, and particularly by $T^2$, are octyl, nonyl, decyl, hendecyl, dodecyl (lauryl), tridecyl, tetradecyl (myristyl), pentadecyl, hexadecyl (cetyl), heptadecyl (margaryl), octadecyl (stearyl), nonadecyl, eicosanyl (arachidyl), heneicosanyl, docosanyl (behenyl), tricosanyl, tetracosanyl (lignoceryl), hexacosanyl (ceryl), 9-hexadecenyl (palmitoleyl), 9-octadecenyl (oleyl), 10-eicosenyl, 9,12-octadecadienyl (linoleyl), 6-hexoxyhexyl, ethylcyclohexyl and cyclohexylethyl, especially where these are straight chains. In the case of $T^4$ and $T^5$ these may be joined to Ring A through an oxygen, sulphur or nitrogen atom or through a —CO—, —$SO_2$—, —CO.O— or —$SO_2$.O— link, examples being methoxy, methylthio, ethoxy, butoxy, butylthio, octoxy, dodecoxy, dodecylthio, hexadecoxy, octadecoxy, dodecylamino, octadecylamino, octadecoxycarbonyl and dodecoxycarbonyl. Where $T^2$ and $T^3$ together contain at least 8 carbon atoms examples of suitable combinations are hexyl and butyl; ethyl and hexyl; heptyl and methyl; heptyl and propyl; and nonyl and methyl.

The groups independently represented by $T^6$ and $T^7$ may be any non-hydrophilic group and are preferably hydrogen. Where they are other than hydrogen it is preferred that they are electron-donating groups, examples of suitable groups being, $C_{1-4}$-alkyl, $C_{1-4}$-alkoxy, $NH_2$ and mono- and di-substituted amino, especially mono- and di-$C_{1-4}$-alkylamino, such as methylamino, ethylamino and N,N-dimethyl-amino.

Preferred compounds of Formula II are:

(i) 4-(4-[N-n-dodecyl-N-methylamino]phenylazo)-3-nitrobenzoic acid, hereinafter referred to as DPNA, and the related compounds formed by reacting diazotised 3-nitro-4-aminobenzoic acid with the following coupling components under standard conditions, such as those given below for the preparation of the Second NLO Compound (DPNA)

| | |
|---|---|
| N-methyl-N-decylaniline, | N-ethyl-N-n-dodecylaniline, |
| N-ethyl-N-decylaniline, | N-ethyl-N-hexadecenylaniline, |
| N-ethyl-N-tridecylaniline, | N-methyl-N-octadecylaniline, |
| N-arachidylaniline, | N-methyl-N-arachidylaniline, |
| N-lignocenylaniline, | 2-methoxy-N-methyl-N-dodecylaniline, |
| N-butyl-N-dodecylaniline, | 2-methoxy-N-arachidylaniline, |
| N,N-dioctylaniline, | 2-octadecoxy-N,N-dimethylaniline, |
| N,N-diheptylaniline, | N-octadecylbenzoxazoline, |
| N-ethyl-N-hexylaniline, | N-tetradecyldihydro-1,4-benzoxazine |
| N-butyl-N-octylaniline, | 3-amino-N-methyl-N-octadecylaniline, |
| 2-dodecoxy-N-ethylaniline, | 2-octadecoxy-5-methoxyaniline, |
| 2-hexadecenoxyaniline, | 2-(N-ethyl-N-octadecylamino)furan, |
| 2-octadecoxyaniline, | 1-(N-butyl-N-hexylamino)naphthalene, |
| 2-hexadecoxyaniline, | N-dodecyl-1,2,3,4-tetrahydroquinoline |
| N-octadecylaniline, | 2-amino-3-octadecoxycarbonylthiophene |
| 2-(N-methyl-N-hexadecenylamino)thiophene, | |
| 3-N'-methylamino-N-ethyl-N-dodecylaniline, | |
| 2,5-dimethoxy-N-methyl-N-hexadecylaniline, | |
| 2-methoxy-5-amino-N-ethyl-N-octadecylaniline, | |
| 7-methoxy-N-tetradecyl-1,2,3,4-tetrahydroquinoline, | |
| 2-(N-dodecylamino)-3-cyano-6-(N-ethylamino)pyridine, | |
| 2-(N-octadecylamino)-3-cyano-6-(N-ethylamino)pyridine; | |
| 2-(N-methyl-N-octadecylamino)-6-(N-methylamino)pyridine, | | and the coupling components listed below in (ii), (iii) and (iv);

(ii) the compounds formed by reacting diazotised 3-cyano-4-aminobenzoic acid with the following coupling components under standard conditions, such as those given below,

| | |
|---|---|
| N-arachidylaniline, | 2-octadecoxy-N-ethylaniline, |
| N-butyl-N-decylaniline, | 3-amino-N-methyl-N-dodecylaniline, |
| N-octyl-N-decylaniline, | N-ethyl-N-n-dodecylaniline, |
| 2-methoxy-N-methyl-N-octadecylaniline, | |
| 2-(N-methyl-N-hexadecenylamino)thiophene, | |
| 1-(N-methyl-N-dodecylamino)naphthalene, | |
| 2-(N-methyl-N-dodecylamino)-6-amino-pyridine, | | and the coupling components listed in (i) above and (iii) and (iv) below;

(iii) the compounds formed by reacting diazotised 3-methoxycarbonyl-4-aminobenzoic acid with the following coupling components under standard conditions, such as those given below,

| | |
|---|---|
| N-butyl-N-decylaniline, | N-ethyl-N-n-dodecylaniline, |
| N-octyl-N-decylaniline, | 3-amino-N-methyl-N-dodecylaniline, |
| N-arachidylaniline, | 2-octadecoxy-N-ethylaniline, |
| 2-methoxy-N-methyl-N-octadecylaniline, | |
| 2-(N-methyl-N-hexadecenylamino)thiophene, | |
| 1-(N-methyl-N-dodecylamino)naphthalene, | |
| 2-(N-methyl-N-dodecylamino)-6-aminopyridine; | | and the coupling components listed in (i) and (ii) above and (iv) below; and (iv) the compounds formed by reacting diazotised 4-aminoisophthalic acid with the following coupling components under standard conditions, such as those given below,

| | |
|---|---|
| N-butyl-N-decylaniline, | 2-octadecoxy-N-ethylaniline, |
| N-octyl-N-decylaniline, | N-ethyl-N-n-dodecylaniline, |
| N-arachidylaniline, | 3-amino-N-methyl-N-dodecylaniline, |
| 2-methoxy-N-methyl-N-octadecylaniline, | |
| 2-(N-methyl-N-hexadecenylamino)thiophene, | |
| 1-(N-methyl-N-dodecylamino)naphthalene, | |
| 2-(N-methyl-N-dodecylamino)-6-aminopyridine. | | and the coupling components listed under (i), (ii) and (iii) above.

The second NLO compound is non-centrosymmetric and substantially polarised along its longitudinal axis, i.e. through the carboxylate group, TOOC—, the azo group, —N=N—, and the substituted amino group —$NT^2T^3$, because the carboxylate group is electron-withdrawing and the substituted amino group is electron-donating. A molecule of the compound can therefore be represented as an electronic vector directed along this axis from the substituted amino group towards the carboxylate group.

The NLO Element

The inherent properties of the first and second NLO compounds cause them to be aligned in the same manner in the alternating monolayers of the NLO coating. This means that the vectors along the longitudinal axes of the molecules are substantially parallel and in the same sense.

In the NLO coating the long chain aliphatic group (R) in the first NLO compound will be adjacent to the long-chain aliphatic group(s) ($T^2$-$T^4$) in the second NLO compound. As both compounds are non-centrosymmetric and their electronic vectors lie in the same direction the overall effect will be that the NLO coating is noncentrosymmetric along an axis perpendicular to its plane.

In an especially preferred species of the NLO element the NLO coating comprises alternating layers of the NLO compounds:

4-(2-nitro-4-[heptadecyloxycarbonyl]phenylazo)-N-methyl-N-(2-[hydroxycarbonyl]ethyl)aniline, and 4-(2-nitro-4-[hydroxycarbonyl]phenylazo)-N-methyl-N-(n-dodecyl)aniline, in the free acid forms or as the cadmium or calcium salts thereof.

Where the substrate is transparent at the wavelength of light to be used it may be in the form of an optical waveguide carrying on the outer surface a coating of alternating monolayers of the first and second NLO compounds are deposited. With this form of element an optical signal passing along the waveguide interacts with the superficial NLO coating, via the evanescent wave which extends into this coating, and gives rise to non-linear optical effects. Examples of suitable substances for a substrate in the form of a waveguide are glass, lithium niobate and silicon nitride on oxidised silicon.

Alternatively, a transparent substrate may be in the form of a plate or disc on one, or both, surfaces of which the present NLO coating may be formed. With this form of element a non-linear optical effect may be obtained by transverse illumination of the substrate and film(s). Suitable substrates for such an optical element include glass, silica and polymethylmethacrylate (PMMA).

Where the substrate is reflecting it conveniently has a plane reflecting surface on which the present NLO coating may be formed so that the optical signal passes through the coating immediately before and after contact with the reflecting surface. Examples of suitable materials for the reflecting substrate are aluminium, silver, or aluminium or silver films deposited on a support substrate such as glass, silica, quartz or PMMA. With this form of optical element it is possible to attain efficient non-linear processes by exciting the so called "surface plasmon" modes reported in the literature [Stegman et al, Appl. Phys. Lett. 41 (10) 906, 1982; Sand et al, Appl. Optics 21 (22) 3993, 1982].

The present optical element can be prepared by a Langmuir-Blodgett technique and according to a third aspect of the invention there is provided a method for the preparation of an optical element having non-linear optical properties which comprises passing a surface of a transparent or reflecting substrate into a liquid through a first surface carrying a superficial monomolecular layer of the first NLO compound and out of the liquid through a second surface carrying a superficial layer of the second NLO compound, or vice versa.

The liquid, hereinafter referred to as the sub-phase, is preferably an aqueous medium and the mono-molecular layer or layers are obtained in the normal manner by adjustment of the surface area with movable dams in a Langmuir Trough.

The optical element of the second aspect of the invention in various forms, is capable of producing second order non-linear optical effects in a number of ways in various optical devices.

According to a fourth aspect of the present invention there is provided an optical device comprising a non-linear optical element in accordance with the second aspect of the present invention.

An optical device in accordance with the present invention, in which the optical element comprises a substrate in the form of a transparent waveguide having an intimate coating formed by multiple alternating monolayers of the first and the second NLO compounds, consists of an oxidised silicon plate having a first superficial (lower) coating of silicon nitride to form a superficial plane waveguide and a second superficial (upper) NLO coating comprising alternating monolayers of the first and second NLO compounds. In operation, a first optical signal is passed through the waveguide, (in the plane of the waveguide) and interacts with the NLO coating, by way of the evanescent wave which extends into this coating. This interaction generates a second optical signal, at the second harmonic frequency with respect to the first optical signal, which can be detected in the combined optical signal leaving the waveguide.

Figure 2:
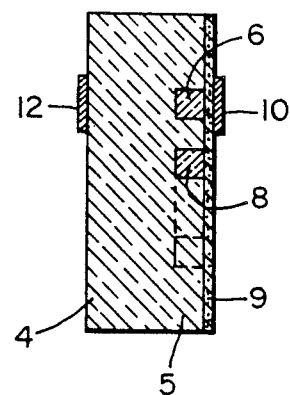

Another device in accordance with the present invention is described in relation to FIGS. 1 and 2 of the accompanying drawings, in which FIG. 1 is a plan view and FIG. 2 is a cross-section on the line X-Y in FIG. 1. In the device the optical element comprises a glass substrate, 4, in the upper surface region, 5, of which are two transparent stripe waveguides, 6 and 8, formed in the desired pattern by the well-known ion exchange or ion bombardment techniques. The stripe waveguides are positioned to run closely parallel over the central part of their length during which they are separated by a distance of a few micrometers (typically 2-5 $\mu$m). The surface of the substrate, 4, is covered with an NLO coating, 9, of alternating monolayers of the first and second NLO compounds. A pair of electrodes, 10, 12, connected to a power source, not shown, is arranged with one electrode, 10, above and the other, 12, below one of the stripe waveguide, 6. In operation an optical signal is passed through the first waveguide, 6, from A to B and a voltage is applied across the electrodes. This alters the refractive index of the NLO coating, due to the d.c. electro-optic (Pockels) effect, and thus the propagation constant of the first waveguide, 6. By suitable adjustment of the applied voltage the propagation constant of the first waveguide, 6, can be arranged so that the optical signal Passing through this waveguide, 6, is coupled into the second waveguide, 8, and produces a second optical signal emerging from the device at C.

The optical element of the second aspect of the present invention may be used in other known forms of optical device incorporating an optical element by replacing the NLO coating used therein, e.g. lithium niobate, with the present NLO coating.

The invention is further illustrated by the following Examples in which all parts and percentages are by weight unless otherwise indicated.

First NLO Compound

COMPOUND 1

(a) 4-Heptadecyloxycarbonyl-2-nitroaniline

A mixture of 4-carboxy-2-nitroaniline (0.52g), heptadecanol (0.7 g) and dimethylaminopyridine (20 mg) in dichloromethane (20 ml) was prepared and dicyclohexyldicarbodiimide (0.62 g) was added. The mixture was stirred for 48 hours and filtered. After separating between chloroform and 3% caustic soda solution the organic phase was washed with water, dried with magnesium sulphate and the solvent removed to leave a yellow solid. The solid was purified by chromatography to give a yellow solid which was recrystallised from 50:50 chloroform-hexane (yield: 0.85 g, m.p. 103°–105° C).

(b)
4-(2-nitro-4-[heptadecyloxycarbonyl]phenylazo)-N-methyl-N-(2-[hydroxycarbonyl]ethyl)aniline (NHMHA)

4-Heptadecyloxycarbonyl-2-nitroaniline (0.42g) was added to cold nitrosyl-sulphuric acid (70 mg of sodium nitrite and 1.5 ml of 98% sulphuric acid) and stirred at 0°–5° C. for 1.5 hours. Urea (0.1 g) was added and then the resulting mixture was added to a cold solution of N-(2-carboxyethyl)-N-methylaniline in a 1:1 mixture of acetic and propionic acids (10 ml). Sodium acetate was added and the reaction mixture was stirred for 1 hour after which time it was diluted with water and filtered. The red solid was purified by chromatography to give red product (yield: 0.15g; mass spec: $M^{+,}$ 610)

COMPOUND 2

4-(2-nitro-4-dodecylphenylazo)-N-methyl-N-(2-[hydroxycarbonyl]ethyl)aniline (NDMHA)

2-Nitro-4-dodecylaniline (3.06g) was dissolved in acetic acid (15ml) and propionic acid (15ml) and warmed whilst dilute hydrochloric acid (5ml) was added. The mixture was cooled to 0° C. and sodium nitrite (0.7g) was added at 0° C. The diazotised amine was then added to N-methyl-N-(2-carboxyethyl)aniline (1.79g) in water (100 ml) with dilute hydrochloric acid (3ml). Sodium acetate was added until colour developed and the mixture was stirred for 0.5 hours. The crude product was recrystallised from $CH_2Cl_2$ to give a red solid (0.2g).

Second NLO Compound 4-(4-[N-n-dodecyl-N-methylamino]phenylazo)-3-nitrobenzoic acid (DPNA)

4-Amino-3-nitrobenzoic acid (3.64g, 0.02M, diazo comp't) was dissolved in dilute sodium hydroxide solution (50ml, 0.3N) at 60° C. Hydrochloric acid (9ml, 36%) was added with stirring to give a fine yellow precipitate and the suspension was then allowed to cool to 30° C. Sodium nitrite (1.38g, 0.02M) was dissolved in water (10 ml) and added dropwise to the suspension. Stirring was continued for 1.5 hours after which the solution was filtered and the filtrates were treated with sulphamic acid to remove excess of nitrous acid. The clear solution was added to a solution of N-n-dodecyl-N-methylaniline (5.5g, 0.02M, coupler) at room temperature giving an immediate red coloration. After a few minutes a dark red precipitate formed and further precipitation was induced by addition of water (100 ml). The solid product was filtered, washed with cold water and dried. The crude product was chromatographed on silica with chloroform as eluent and finally recrystallised from ethanol to yield dark red crystals (2.45g, yield 26%) having the following properties:

Elemental analysis: Found: C 67.0; H 8.0; N 11.6; $C_{26}H_{36}N_4O_4$ requires: C 66.7; H 7.7; N 11.9;

MP: 155°–6° C.;

Absorption maximum (Abs Max): 486nm (in $CHCl_3$);

Infra-red spectrum: 2500–2700 cm $^{-1}$ (br), 1670cm$^{-1}$ (str);

Mass spectrum: 468 ($M^{+,}$ 100%), 313 (100%), 135 (80%).

4-Amino-3-nitrobenzoic acid was obtained from commercial sources (Kodak) and N-n-dodecyl-N-methylaniline was prepared by the method of Breusch and Baykut; Rev Faculte Sci Univ Istambul (1951) 16A, p221 (Chem Abs (1953) 47 3257f).

EXAMPLE 1

The surface of an aqueous sub-phase comprising a 0.25 mM a solution of calcium acetate in water at pH 6.3 (water purified using a Milli-Q system) contained in a Joyce-Loebl Langmuir Trough was divided by means of a flexible PTFE floating barrier containing a leave spring valve. The leaf spring valve permitted a plane glass plate to be moved through the floating barrier while partially immersed in the sub-phase, without contact between the superficial layers on either side of the floating barrier, so that the plate could be passed into the sub-phase on one side of the barrier and withdrawn from the sub-phase on the other side of the barrier. The flexibility in the floating barrier allowed the maintenance of equal surface pressures on both side thereof.

A superficial layer of NHMHA (see "First NLO Compound" above) was prepared by slowly dripping a 2.0 mM solution of NHMHA in chloroform from a micro-syringe onto the surface of the sub-phase on one side (Side 1) of the floating barrier.

A superficial layer of DNPA (see "Second NLO Compound" above) was prepared by slowly dripping a 2.0 mM solution of DNPA in chloroform from a microsyringe onto the surface of the sub-phase on the other side (Side 2) of the floating barrier.

The solvent from each solution was permitted to evaporate and the surface pressure on both sides of the floating barrier was adjusted to 30 mN/m, by movement of an adjustable barrier in the trough, and maintained at 30 mN/m throughout the dipping process.

A thin glass plate, pre-cleaned by ultrasonic washing in chloroform and methanol, was dipped into the sub-phase on Side 1 of the trough without any deposition. The plate was then withdrawn from the sub-phase at a rate of 0.5 cm/min, during which a monomolecular layer of NHMHA was deposited, in the hydrophilic mode, and inserted into Side 2 at the same rate, during which a mono-molecular layer of DNPA was deposited, in the hydrophobic mode, on top of the layer of NHMHA. While immersed in the sub-phase, the plate was then moved through the spring leaf valve, from Side 2 to Side 1 of the floating barrier. The cycle of withdrawal from Side 1, insertion into Side 2 and movement through the spring leaf valve was repeated until a thick coating of alternating monolayers of NHMHA and DPNA had been built up on all surfaces of the plate which had passed into the sub-phase. Substantially all the molecules of NHMHA and DPNA in the coating were aligned in parallel array with their vectors in the same sense. The resulting optical element (hereinafter referred to as "OA1") comprised a glass substrate covered on both plane surfaces with an NLO coating comprising a plurality of alternating monolayers of NHMHA and DPNA.

EXAMPLE 2

The optical element described in Example 1 (OA1) was used in the following manner to demonstrate its NLO properties.

A beam of radiation from a Nd:YAG pulsed laser (wavelength: 1,064 nm; pulse duration 20ns; repetition rate 10 Hz) was passed transversely through the plate and the NLO coating. The intensity of radiation at the second harmonic (wavelength: 530 nm) generated during passage through the element, after filtering out the transmitted radiation at the fundamental wavelength (1,064 nm), was detected and measured with a photomultiplier. After calibration with a 2mm thick quartz reference plate, the calculated value of the second order NLO coefficient, Khi$^{(2)}$ was $4.25 \times 10^{-21}$ $C^3J^{-2}$. The average molecular second order electronic polarisability, SOEP[1.06]estimated from Khi$^{(2)}$ is $1.6 \times 10^{-48}$ $C_3J^{-2}m^3$ or $4.32 \times 10^{-28}$ $cm^5/esu$.

We claim:

1. An optical element having non-linear optical properties comprising a transparent or reflecting substrate having at least a partial superficial coating consisting essentially of alternating monolayers of a first non-linear optical (NLO) compound of the formula:

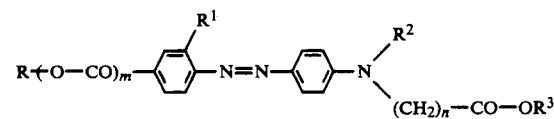

wherein
R is a non-hydrophilic group containing from 8 to 20 carbon atoms selected from the class consisting of alkyl, alkenyl or cycloalkyl;
m is 1 or 2;
$R^1$ is $NO_2$, CN or $COOR^2$;
$R^2$ is H or $C_{1-4}$-alkyl;
n is from 1 to 4; and
$R^3$ is H, a metal or $NH_4$— or mono-, di- or tri- and quaternary alkyl or substituted alkyl ammonium; bis(ammonium), quanidinum; biguanidinium and amidinium and
a second NLO compound of the formula:

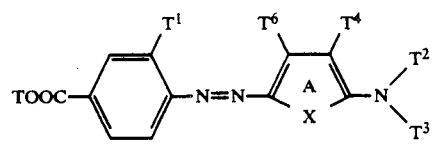

wherein
T is H, a metal or $NH^{4-}$ or mono-, di- or tri- or quaternary alkyl or substituted alkyl ammonium; bis-(ammonium), quanidinium; biguanidinium and amidinium;
X is S, O,

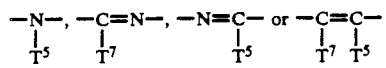

$T^1$ is $NO_2$, CN or COOY;
Y is selected from H, $C_{1-4}$-alkyl, a metal or $NH^{4-}$ or mono-, di- or tri- or quaternary alkyl or substituted alkyl ammonium; bis(ammonium), guanidinium; biguanidinium and amidinium;
$T^2$ and $T^3$ are each independently H or a non-hydrophilic aliphatic or cycloaliphatic group containing up to 30 carbon atoms selected from the class consisting of alkyl, alkenyl or cycloalkyl;
$T^4$ and $T^5$ are each independently H or a non-hydrophilic aliphatic or cycloaliphatic group consisting up to 30 carbon atoms selected from the class consisting of alkyl, alkenyl or cycloalkyl; and
$T^6$ and $T^7$ are each independently H or a non-hydrophilic group containing up to 4 carbon atoms selected from the class consisting of alkyl, alkenyl or cycloalkyl; or
$T^4$ and $T^6$ together comprise ring fused to Ring A and $T^5$ and $T^7$ are as hereinbefore defined; or
$T^5$ and $T^7$ together comprise ring fused to Ring A and $T^4$ and $T^6$ are as hereinbefore defined; or
$T^2$ and $T^4$ together with the N atom to which $T^2$ is attached form a ring fused to Ring A and $T^3$ and $T^5$ are as hereinbefore defined; or
$T^3$ and $T^5$ together with the N atom to which $T^3$ is attached form a ring fused to Ring A and $T^2$ and $T^4$ are as hereinbefore defined;
provided there are, in total, from 8 to 40 carbon atoms in one or two of the groups independently represented by $T^2$, $T^3$, $T^4$ and $T^5$.

2. An optical element according to claim 1 in which in the first NLO compound R is a group containing from 8 to 20 carbon atoms consisting of an alkyl, alkenyl or cycloalkyl group.

3. An optical element according to claim 2 in which in the first NLO compound:
R is $C_{12-18}$-alkyl;
$R^1$ is nitro;
$R^2$ is H, methyl or ethyl;
n is 1 or 2; and
$R^3$ is H, cadmium, barium, lead or calcium.

4. An optical element according to claim 1 in which the first NLO compound is 4-(2-nitro-4-[heptadecyloxycarbonyl]phenylazo)-N-methyl -N-(2-[hydroxycarbonyl]ethyl)aniline or 4-(2-nitro-4-dodecylphenylazo)-N-methyl-N-(2-[hydroxycarbonyl]ethyl)aniline.

5. An optical element according any one of claims 1 to 4 in which in the second NLO compound $T^2$ or $T^4$ is a group containing from 8 to 20 carbon atoms consisting of an alkyl, alkenyl or cycloalkyl group .

6. An optical element according to claim 5 in which in the second NLO compound:
$T^2$ is $C_{12-18}$-alkyl;
X is $T^7$—C≡C—$T^5$;
$T^3$, $T^4$, $T^5$, $T^6$ and $T^7$ are H or $C_{1-4}$-alkyl;
$T^1$ is nitro; and
T is H, cadmium, barium, lead or calcium.

7. An optical element according to claim 6 in which the second NLO compound is 4-(4-[N-n-dodecyl-N-methylamino]phenylazo)-3-nitrobenzoic acid or 4-(4-[N-n-octadecyl-N-methylamino]phenylazo)-3-nitrobenzoic acid.

* * * * *